(12) United States Patent
Abel et al.

(10) Patent No.: US 12,717,412 B1
(45) Date of Patent: Aug. 25, 2026

(54) WEARABLE BREATH CONTROL AND ATTENTION FOCUSING HAPTIC WRISTBAND DEVICE

(71) Applicants: Koji Yaseen Abel, Palmdale, CA (US); Jamira Renee Alford, Palmdale, CA (US); Isabel Amaya, Palmdale, CA (US); Angel Marlene Avalos, Palmdale, CA (US); Sheyla Aviles, Palmdale, CA (US); E'niyah Symone Berry, Palmdale, CA (US); Alejandro Castro, Palmdale, CA (US); Linyu Iran Chen, Palmdale, CA (US); Kevin Gustavo Flores, Palmdale, CA (US); Yahany Verenice Francisco, Palmdale, CA (US); Maria Hassan Gilani, Palmdale, CA (US); Mario Giancarlo Guzman Perez, Palmdale, CA (US); Jacob Joseph Hilsinger, Palmdale, CA (US); Vanessa Ibarra, Palmdale, CA (US); Sibah Ahmed Jasem, Palmdale, CA (US); Orisha Yemaya Lamon, Palmdale, CA (US); Leilani Natalia Martinez Abarca, Palmdale, CA (US); Michelle Medina, Palmdale, CA (US); Kaitlyn Victoria Morales, Palmdale, CA (US); Miralla Nader, Palmdale, CA (US); Hazel Deniece Oliva, Palmdale, CA (US); Kaylie Elizabeth Parker, Palmdale, CA (US); Anthony Tyrone Perry, II, Palmdale, CA (US); Elizabeth Marie Quinteros, Palmdale, CA (US); Benjamin Igmidio Sanchez, Palmdale, CA (US); Maria Eugenia Santos, II, Palmdale, CA (US); Rachel Kathleen Makamae Thibault, Palmdale, CA (US); Victoria Alicia Veloz, Palmdale, CA (US)

(72) Inventors: Koji Yaseen Abel, Palmdale, CA (US); Jamira Renee Alford, Palmdale, CA (US); Isabel Amaya, Palmdale, CA (US); Angel Marlene Avalos, Palmdale, CA (US); Sheyla Aviles, Palmdale, CA (US); E'niyah Symone Berry, Palmdale, CA (US); Alejandro Castro, Palmdale, CA (US); Linyu Iran Chen, Palmdale, CA (US); Kevin Gustavo Flores, Palmdale, CA (US); Yahany Verenice Francisco, Palmdale, CA (US); Maria Hassan Gilani, Palmdale, CA (US); Mario Giancarlo Guzman Perez, Palmdale, CA (US); Jacob Joseph Hilsinger, Palmdale, CA (US); Vanessa Ibarra, Palmdale, CA (US); Sibah Ahmed Jasem, Palmdale, CA (US); Orisha Yemaya Lamon, Palmdale, CA (US); Leilani Natalia Martinez Abarca, Palmdale, CA (US); Michelle Medina, Palmdale, CA (US); Kaitlyn Victoria Morales, Palmdale, CA (US); Miralla Nader, Palmdale, CA (US); Hazel Deniece Oliva, Palmdale, CA (US); Kaylie Elizabeth Parker, Palmdale, CA (US); Anthony Tyrone Perry, II, Palmdale, CA (US); Elizabeth Marie Quinteros, Palmdale, CA (US); Benjamin Igmidio Sanchez, Palmdale, CA (US); Maria Eugenia Santos, II, Palmdale, CA (US); Rachel Kathleen Makamae Thibault, Palmdale, CA (US); Victoria Alicia Veloz, Palmdale, CA (US)

( * ) Notice: Subject to any disclaimer, the term of this patent is extended or adjusted under 35 U.S.C. 154(b) by 361 days.

(21) Appl. No.: 18/587,925

(22) Filed: Feb. 26, 2024

Related U.S. Application Data

(60) Provisional application No. 63/507,693, filed on Jun. 12, 2023, provisional application No. 63/486,967, filed on Feb. 25, 2023.

(51) Int. Cl.
*G06F 3/048* (2013.01)
*G06F 1/16* (2006.01)
(Continued)

(52) U.S. Cl.
CPC .............. *G06F 3/016* (2013.01); *G06F 1/163* (2013.01); *H05B 45/10* (2020.01)

(58) Field of Classification Search
CPC .......... G06F 3/016; G06F 1/163; H05B 45/10
See application file for complete search history.

(56) References Cited

U.S. PATENT DOCUMENTS 6,659,689 B1 * 12/2003 Courtney .............. B63C 9/1255 2/2.5
9,645,646 B2 * 5/2017 Cowley ................... G06F 3/016
(Continued)

FOREIGN PATENT DOCUMENTS

CN 112439119 A * 3/2021 ........... A61B 5/0205
CN 216169741 U * 4/2022
(Continued)

*Primary Examiner* — Rashawn N Tillery
(74) *Attorney, Agent, or Firm* — IPTechLaw

(57) ABSTRACT

Implementations of a wristband device may include a breathing guidance portion; a haptic feedback and compression portion; and an armband portion including pneumatic compression elements.

11 Claims, 10 Drawing Sheets

(51) Int. Cl.
*G06F 3/01* (2006.01)
*H05B 45/10* (2020.01)

(56) References Cited

U.S. PATENT DOCUMENTS 12,353,625 B1 * 7/2025 Gonzalez ................ G06F 3/016
2011/0172576 A1 * 7/2011 Castro ....................... A61F 5/03 602/19
2015/0164416 A1 * 6/2015 Nothacker ......... G01N 33/4972 340/573.1
2016/0029693 A1 * 2/2016 Klein ..................... G16H 20/70 434/236
2016/0100793 A1 * 4/2016 Barak .................. A61B 5/4519 600/301
2023/0075461 A1 * 3/2023 Agarwal ................. G06F 3/016
2023/0133303 A1 * 5/2023 Agarwal ................. G06F 3/014 91/508
2023/0255510 A1 * 8/2023 Hill ...................... A61B 5/7405 600/538
2024/0024618 A1 * 1/2024 Shah ..................... A61M 21/02
2025/0117088 A1 * 4/2025 Jumet ................... H04W 4/029

FOREIGN PATENT DOCUMENTS

CN 115920300 A * 4/2023
DE 102024105953 A1 * 9/2025 ............. G06F 3/017
KR 20150057035 A * 5/2015 ........ H04M 1/72403
KR 20230118404 A * 8/2023 ........... A61B 5/0806
WO WO-2023177793 A1 * 9/2023 ............. A61H 31/00
WO WO-2023228808 A1 * 11/2023 ............. G06F 3/016
WO WO-2025054601 A1 * 3/2025 ............. G16H 40/63

* cited by examiner

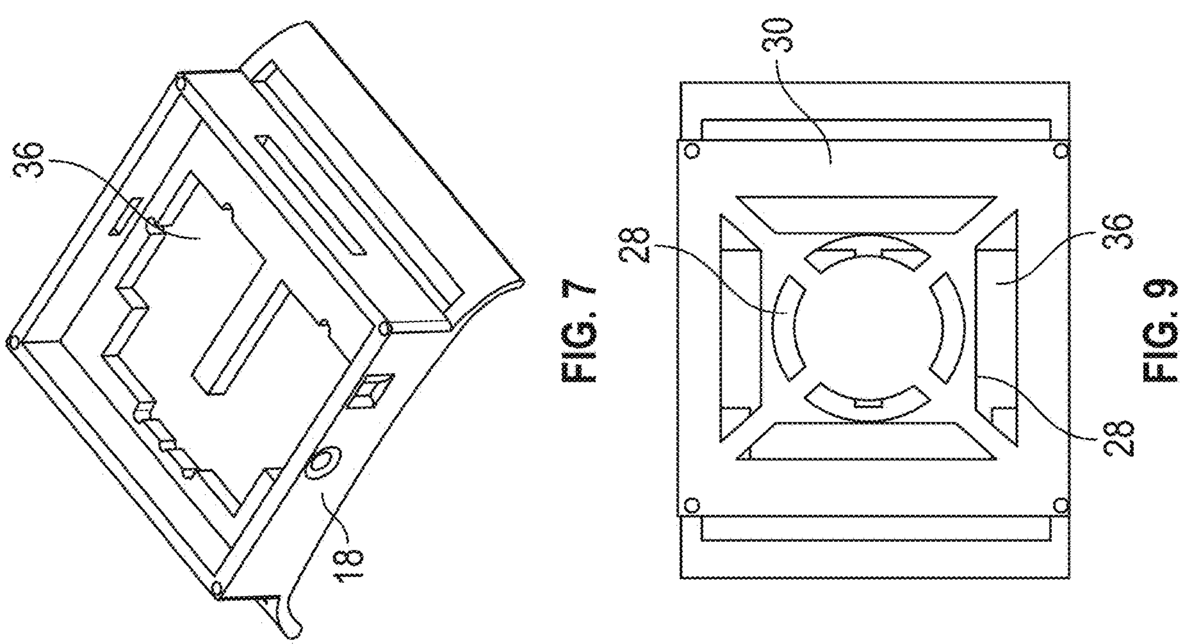
FIG. 7
FIG. 9
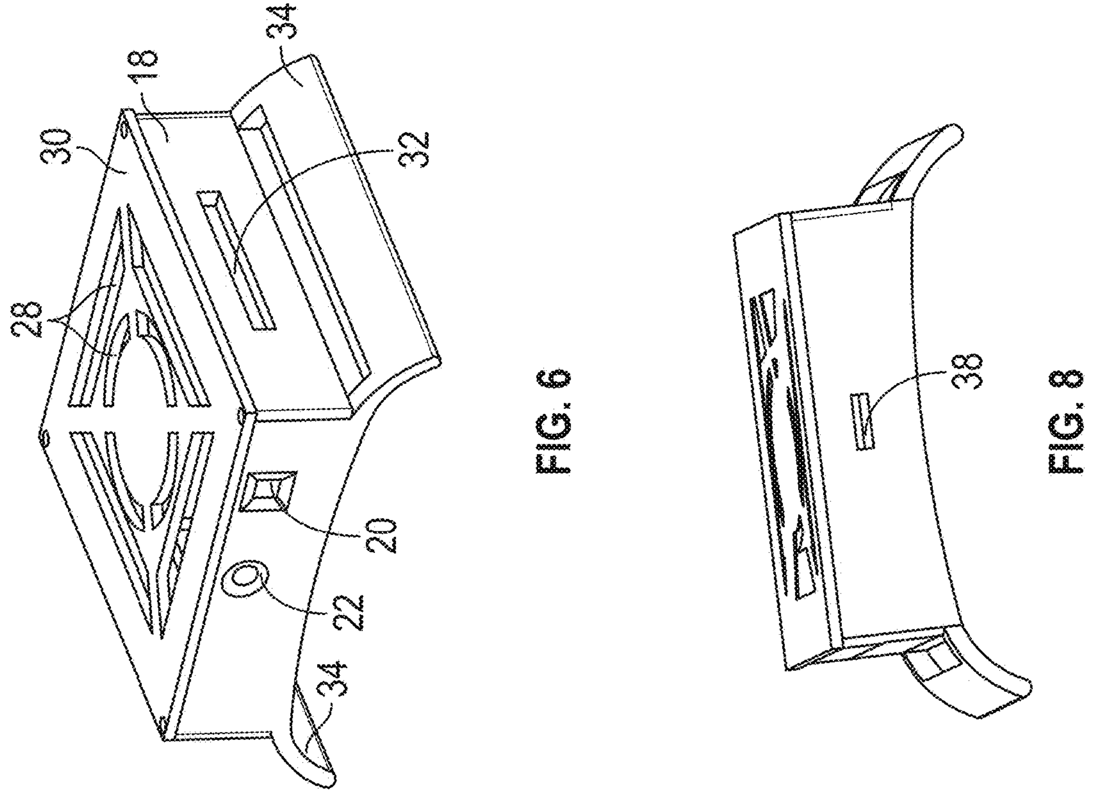
FIG. 6
FIG. 8

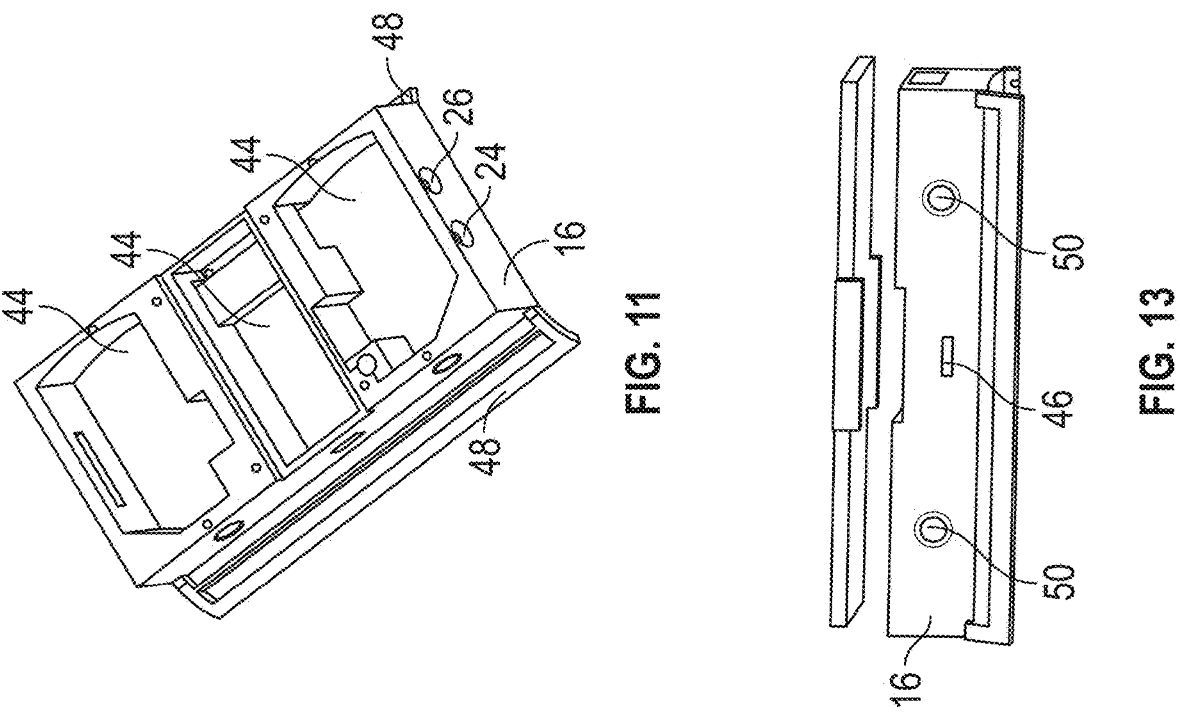
FIG. 11
FIG. 13
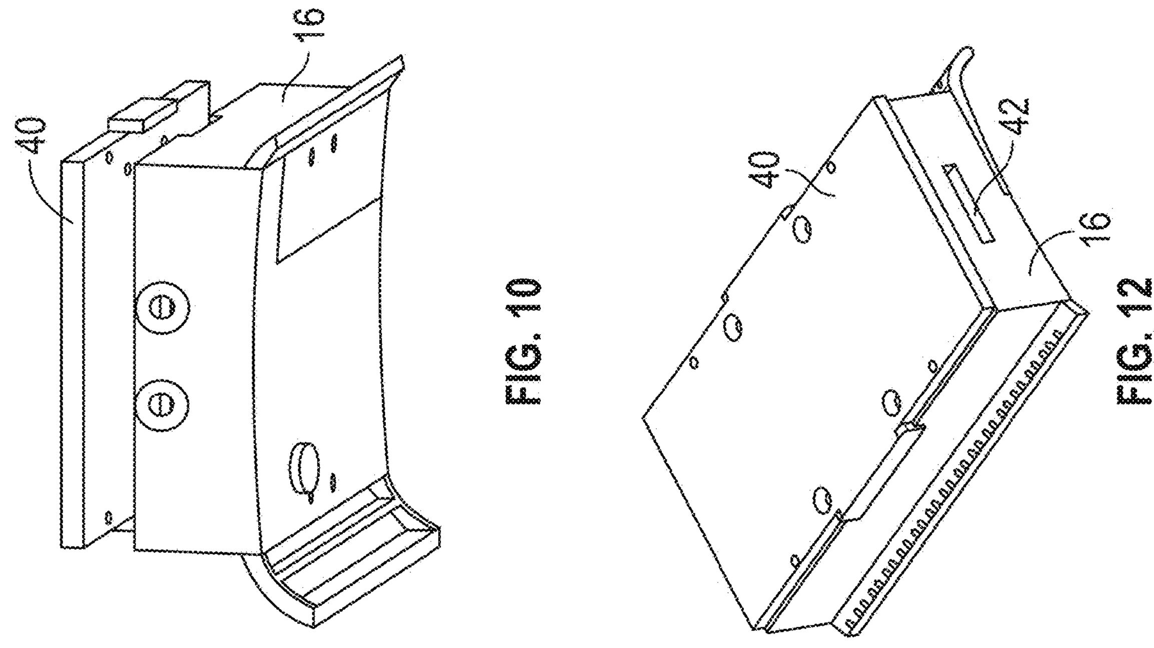
FIG. 10
FIG. 12

WEARABLE BREATH CONTROL AND ATTENTION FOCUSING HAPTIC WRISTBAND DEVICE

CROSS REFERENCE TO RELATED APPLICATIONS

This document claims the benefit of the filing date of U.S. Provisional Patent Application 63/486,967, entitled "Wearable Breath Control and Attention Focusing Haptic Wristband Device" to Abel et al. which was filed on Feb. 25, 2023, the disclosure of which is hereby incorporated entirely herein by reference.

This application also claims the benefit of the filing date of U.S. Provisional Patent Application 63/507,693, entitled "Wearable Breath Control and Attention Focusing Haptic Wristband Device" to Abel et al. which was filed on Jun. 12, 2023, the disclosure of which is hereby incorporated entirely herein by reference.

BACKGROUND

1. Technical Field

Aspects of this document relate generally to wearable devices.

2. Background

Devices for conveying information include components for displaying information. Various devices include electronic storage for the information being conveyed.

SUMMARY

Implementations of a wristband device may include a breathing guidance portion; a haptic feedback and compression portion; and an armband portion including pneumatic compression elements.

Implementations of a wristband device may include one, all, or any of the following:

The pneumatic compression elements may be McKibben muscles.

The breathing guidance portion may include a first set of light emitting diodes arranged in a square pattern and a second set of light emitting diodes arranged in a circular pattern.

The breathing guidance portion may include a round button configured to activate the second set of light emitting diodes in a circle breathing cycle and a square button configured to activate the first set of light emitting diodes in box breathing cycle.

The compression portion may include at least one pump and at least one valve.

The breathing guidance portion may include a privacy film.

The haptic feedback and compression portion may include a linear vibration haptic device.

The haptic feedback and compression portion may include a button configured to activate the linear vibration haptic device and a button configured to activate the pneumatic compression elements.

The breathing guidance portion and the haptic feedback and compression portion each include a charging port.

Implementations of a wristband device may include a housing including a breathing guidance portion and a haptic feedback and compression portion; and an armband portion including pneumatic compression elements.

Implementations of a wristband device may include one, all, or any of the following:

The pneumatic compression elements may be McKibben muscles.

The breathing guidance portion may include a first set of light emitting diodes arranged in a square pattern and a second set of light emitting diodes arranged in a circular pattern.

The breathing guidance portion may include a round button configured to activate the second set of light emitting diodes in a circle breathing cycle and a square button configured to activate the first set of light emitting diodes in box breathing cycle.

The compression portion may include at least one pump and at least one valve.

The housing may include a privacy film.

The haptic feedback and compression portion may include a linear vibration haptic device.

The housing may include a button configured to activate the linear vibration haptic device and a button configured to activate the pneumatic compression elements.

The housing may include a charging port.

Implementations of a method of treating anxiety or attention deficit hyperactivity disorder may include providing a wristband device including a breathing guidance portion, a haptic feedback and compression portion, and an armband portion including pneumatic compression elements. The breathing guidance portion may include at least a first set of light emitting diodes arranged in a square pattern. The method may also include activating at least a first light emitting diode of the first set of light emitting diodes to guide a box breathing technique by a wearer of the wristband device; simultaneously activating the pneumatic compression elements to cause compression using the pneumatic compression elements on the wrist of the wearer; releasing the compression elements and deactivating at least the first light emitting diode of the first set of light emitting diodes; and activating at least a second light emitting diode of the first set of light emitting diodes and simultaneously activating the compression elements.

Implementations of a method of treating anxiety or attention deficit hyperactivity disorder may include one, all, or any of the following:

The box breathing technique may be continued for thirty-two seconds.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 6 is a perspective view of a breathing guidance portion of a wristband device;

FIG. 7 is a top perspective view of the internal structure of a housing of the breathing guidance portion of FIG. 6;

FIG. 8 is a side view of the breathing guidance portion of FIG. 6;

FIG. 9 is a top view of the breathing guidance portion of FIG. 6;

FIG. 10 is a side exploded view of a haptic feedback and compression portion of a wristband device;

FIG. 11 is a top perspective view of a housing of the haptic feedback and compression portion of FIG. 10;

FIG. 12 is a top perspective view of the haptic feedback and compression portion of FIG. 10;

FIG. 13 is a side exploded view of the haptic feedback and compression portion of FIG. 10;

FIG. 20 is a front view of an implementation of a wristband device.

DESCRIPTION

This disclosure, its aspects and implementations, are not limited to the specific components, assembly procedures or method elements disclosed herein. Many additional components, assembly procedures and/or method elements known in the art consistent with the intended wristband devices will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such wristband devices, and implementing components and methods, consistent with the intended operation and methods.

For those with attention deficit hyperactivity disorder (ADHD) or who have anxiety, the use of breath control techniques and/or sensory feedback like vibration or compressions applied to the skin help with redirection of focus/calming. Children, especially those with ADHD and anxiety, tend to get overstimulated after prolonged hours of instruction in a school environment. The various wristband devices disclosed in this document work to assist children and other wearers with implementing breathing techniques and with receiving sensory feedback to allow them to redirect focus back to their work or their current environment.

Figure 1:
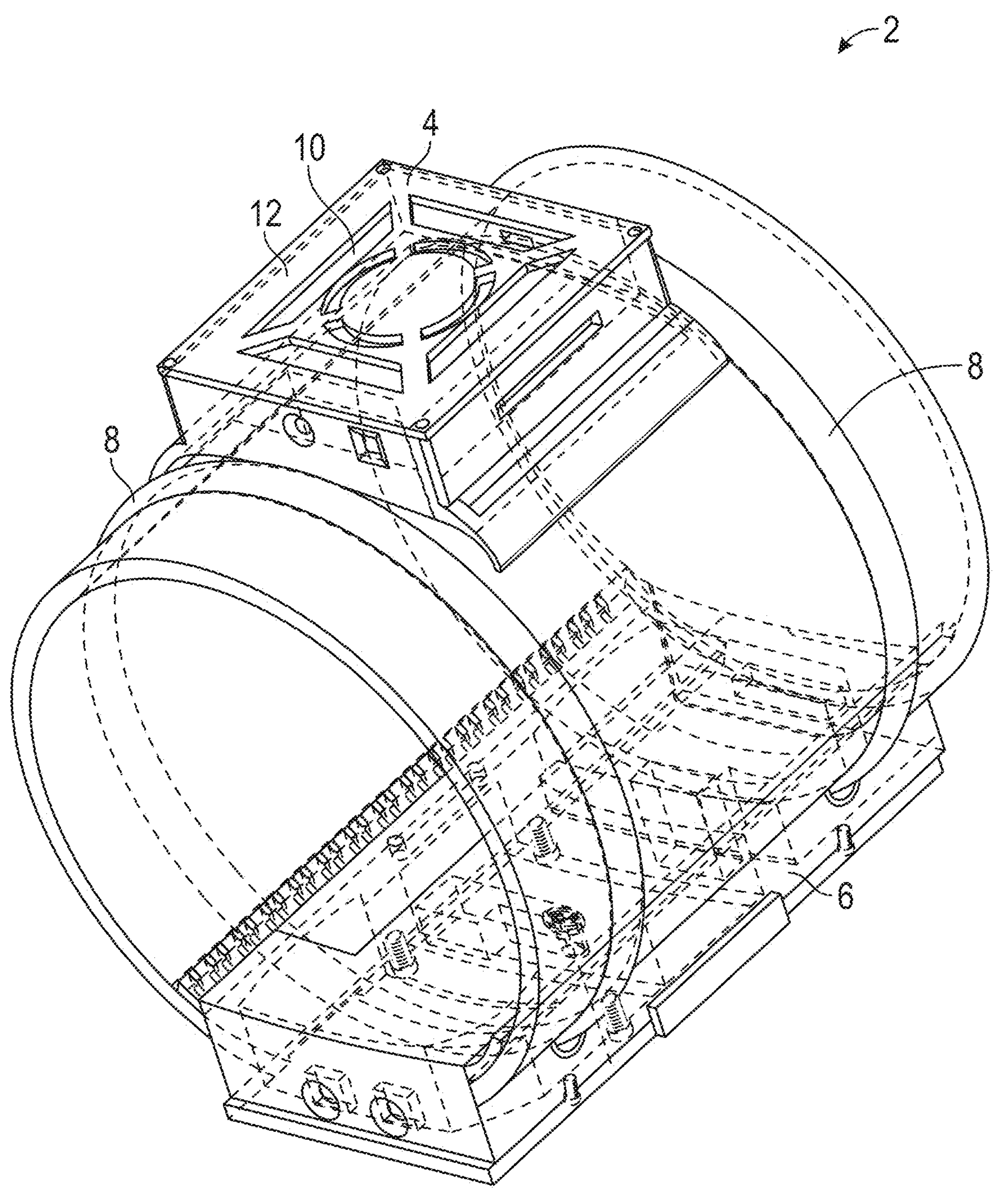
FIG. 1 is a perspective view of an implementation of a wristband device.

Referring to FIG. 1, an implementation of a wristband device 2 used for breath control and haptic feedback is illustrated. As illustrated, the wristband device 2 includes a breathing guidance portion 4 and a haptic feedback and compression portion 6 coupled together through an armband portion 8 that includes pneumatic compression elements 10. In various system implementations, the pneumatic compression elements 10 are McKibben muscles designed to contract when air from at least one pump controlled by at least one valve contacts the McKibben muscles, causing the pneumatic compression elements to reduce the size of the armband portion 8 and applying pressure to the wearer's skin. The at least one pump and the at least one valve are included in the haptic feedback and compression portion 6.

The implementation of the breathing guidance portion 4 illustrated in FIG. 1 includes components that enable two different breathing control exercises, both of which are referred to herein as box breathing techniques. A first set of light emitting diodes (LEDs) is arranged in a square pattern on a circuit board included in the breathing guidance portion 4 which enables a first box breathing technique (cycle). A second set of LEDs in a circle pattern on a circuit board included in the breathing guidance portion 4 is used to enable the wearer to carry out a second box breathing technique. In various implementation, the first set of LEDs and second set of LEDs are included on the same circuit board. As a way of helping the wearer have some additional privacy while carrying out the box breathing techniques, a privacy film 10 is located inside the housing 12 of the breathing guidance portion 4 which serves to attenuate a desired portion of the light from the sets of LEDs so that it is sufficient for the wearer to see them, but more difficult for others around the wearer to notice it. This privacy film may be selected from any partially transparent material to the wavelength(s) of light emitted by the LEDs.

Figure 2:
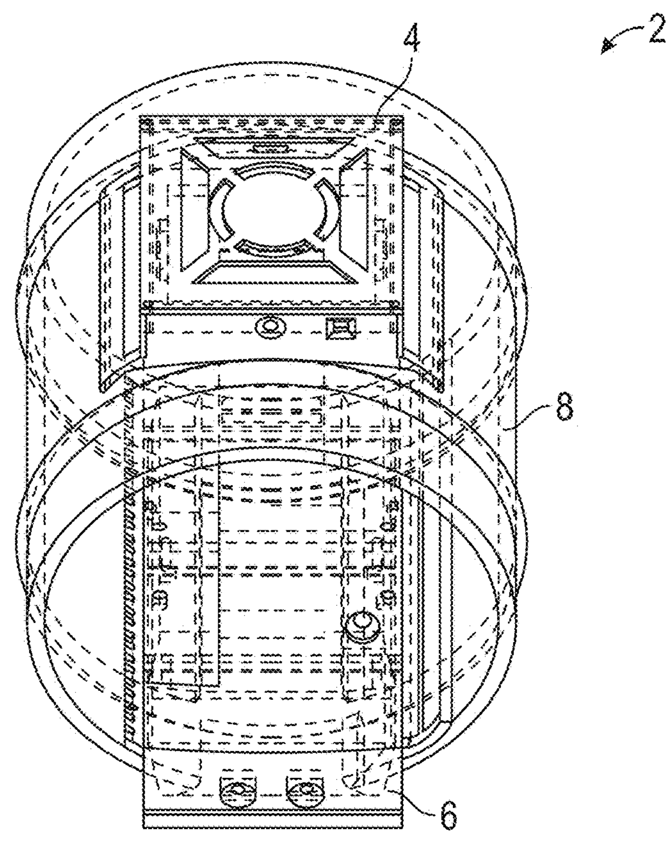
FIG. 2 is another perspective view of the wristband device of FIG. 1.
Figure 3:
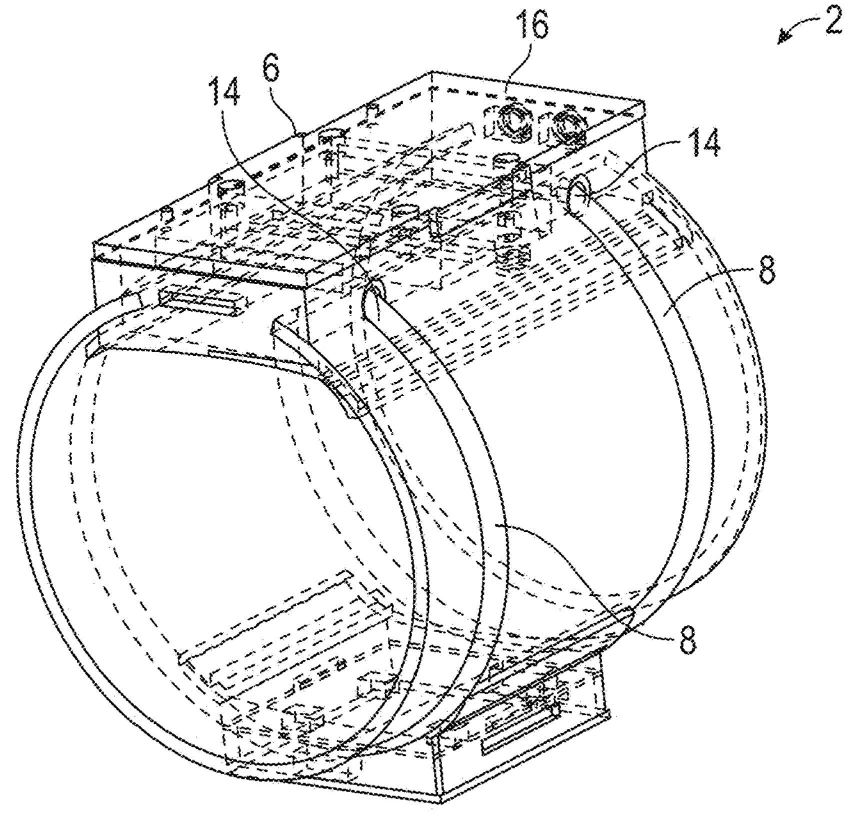
FIG. 3 is a perspective bottom view of the wristband device of FIG. 1.

Referring to FIG. 2, a perspective view of the implementation of the wristband device 2 of FIG. 1 is illustrated in a partial see-through view. Here the alignment of the breathing guidance portion 4 over the haptic feedback and compression portion 6 can be seen, as they are located on opposite sides of the armband portion 8. FIG. 3 illustrates a bottom view of the wristband device 2, which further illustrates how the pneumatic elements 8 enter into apertures 14 in the housing 16 of the haptic feedback and compression portion 6 and ultimately fluidly couple internally with the at least one pump and the at least one valve to receive fluid (whether air or another fluid) to activate the compression action of the pneumatic elements.

Figure 4:
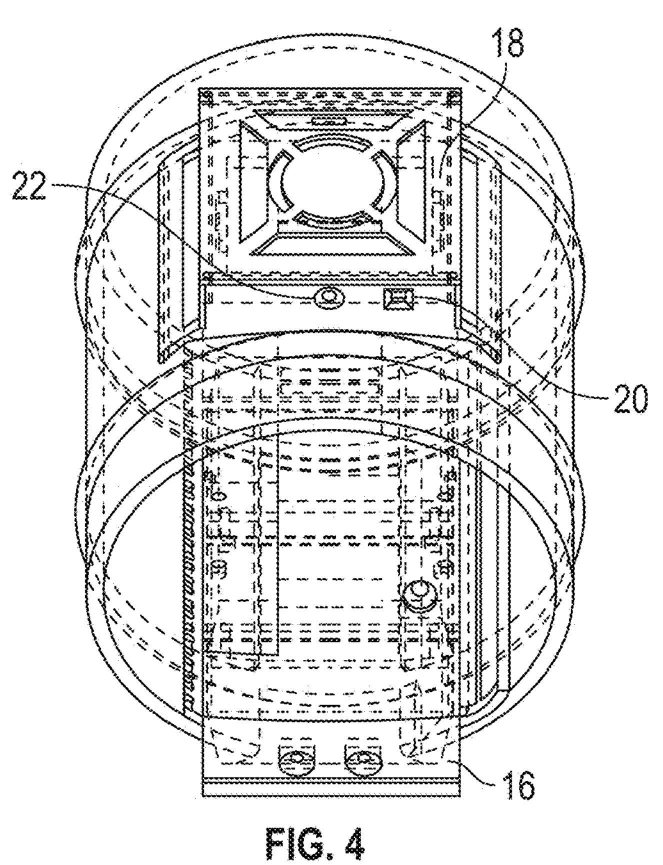
FIG. 4 is a perspective view of the wristband device of FIG. 1.
Figure 5:
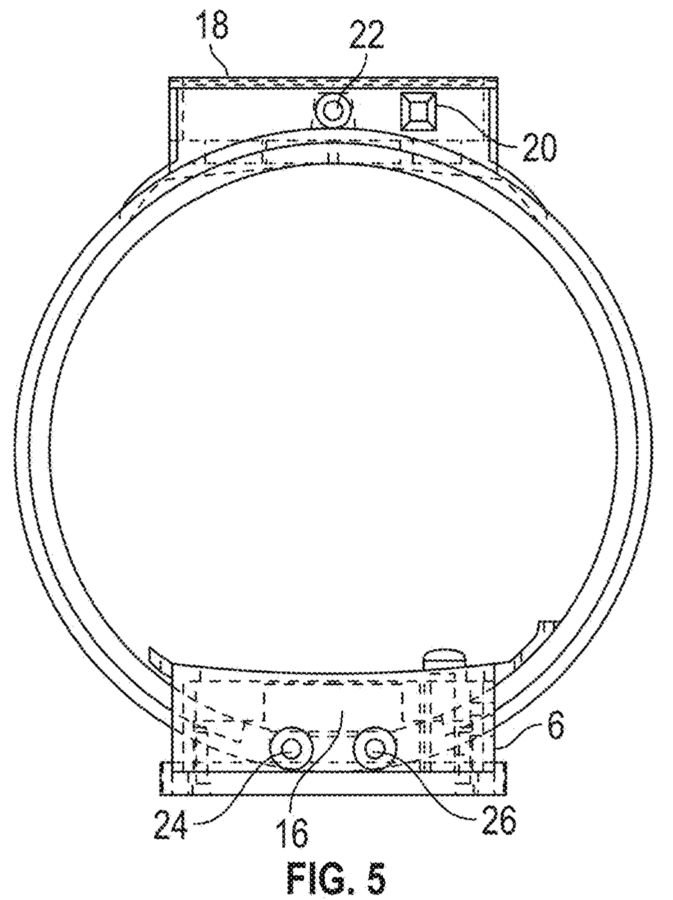
FIG. 5 is a side view of the wristband device of FIG. 1.

Referring to FIGS. 4-5, these views of the wristband device 2 of FIG. 2 illustrate how the breathing guidance portion 4 includes a housing 18 that includes a first button 20 and second button 22. The first button 20 is shaped like a square/rectangle and is designed to activate the first set of LEDs that are arranged in a square on the circuit board included in the housing 18. The second button 22 is shaped like a circle/ellipse and is designed to activate the second LEDs that are arranged in a circle on the circuit board. The haptic feedback and compression portion 6 also includes a housing 16 that includes a first button 24 and a second button 26. Either the first button 24 or the second button 26 may be designed to activate a linear vibration haptic device connected to a circuit board included in the housing 16, causing it to vibrate directly on demand, or to begin vibrating periodically according to a predetermined pattern. Either the first button 24 or the second button 26 may be designed to activate the pneumatic compression elements by activating the pump and valve included in the housing 16 to provide compression to the wearer's skin on demand, or according to a predetermined pattern.

Referring to FIG. 6, an implementation of a housing 18 for a breathing guidance portion 4 is illustrated in a perspective view. Here, a series of apertures 28 are formed through a top cover 30 of the housing which are aligned to allow the wearer to see the first set of LEDs and second LEDs through the apertures 28. The buttons 22 and 20 are also present with the shape of each button designed to allow the wearer to feel them to activate the proper set of LEDs for the particular desired box breathing technique desired. Also present in the housing 18 is a slot 32 for a memory card such as, by non-limiting example, an SD (secure digital), microSD, or other memory card to allow for the programming of the circuit board in the housing 18 to be updated. The housing 18 also includes attachment structure 34 for the armband portion to be coupled to during use.

FIG. 7 show the housing 18 with the top cover 30 removed and the circuit board removed showing recesses 36 into which the circuit board, a battery, or other desired electronics can be placed and stored to be ready for operation. The view of the housing 18 illustrated in FIG. 8 shows a communication/power slot 38 which electrically couples with a battery or other energy storage device within the housing. In various implementations, the communication/power slot/charging port 38 may be, by non-limiting example, a micro universal serial bus port, a universal serial bus-C (USB-C) port, a lightning connector, a power port, or any other power and/or data transfer system port type.

FIG. 9 illustrates a top down view of the housing 18 showing the apertures 28 of the top cover 30 and their alignment with the recesses 36. While a particular arrangement of apertures 28 is illustrated, the apertures may be located as desired to expose the desired sets of LEDs or individual LEDs of the sets of LEDs. While the use of LEDs and apertures in a top cover of the housing is also illustrated, in some implementations of wristband devices, a liquid crystal display or other display may be used which may be operatively coupled with a microprocessor and memory to activate the display to guide the wearer to implement the desired box breathing technique. In such implementations, physical buttons may be retained in the housing structure or the buttons may be formed in a computing interfaced formed on the display and activate by a touch from the wearer.

FIG. 10 is a side exploded view of an implementation of a housing 16 for the haptic feedback and compression portion 6. As illustrated, the housing 16 also has a top cover 40 which in FIG. 12 is illustrated in a closed position over the housing 16. In this implementation, the housing 16 includes a slot 42 for an SD, microSD, or other memory card designed to allow for programming of the circuit board included in the housing 18. However, in various implementations, the circuit boards in the breathing guidance portion and the haptic feedback and compression portion may be electrically coupled together so a slot for a memory card may be included in only one or the other of the two portions. FIG. 11 illustrates the interior of the housing 16 that includes recesses 44 for one or more circuit boards, the at least one pump, and the at least one valve of the pneumatic system that drives the pneumatic compression elements. These recesses 44 also include space for the haptic feedback element included in the haptic feedback and compression portion 6. In various implementations, no slot for a memory card may be used.

Locations for the first button 24 and the second button 26 in the housing 16 are also illustrated in FIGS. 11 and 13. A slot 46 for receiving power/signals into a battery included in the housing 16 is also illustrated. Any of the previously mentioned power and communication port technology may be employed via the slot 46 in various haptic feedback and compression portion implementations. The housing also includes armband portion coupling components 48 that couple with the armband along with openings 50 which are designed to receive the pneumatic elements 8 and fluidly couple the pneumatic elements with the at least one pump and the at least one valve during operation. The pneumatic elements may be any type disclosed in this document.

Figure 14:
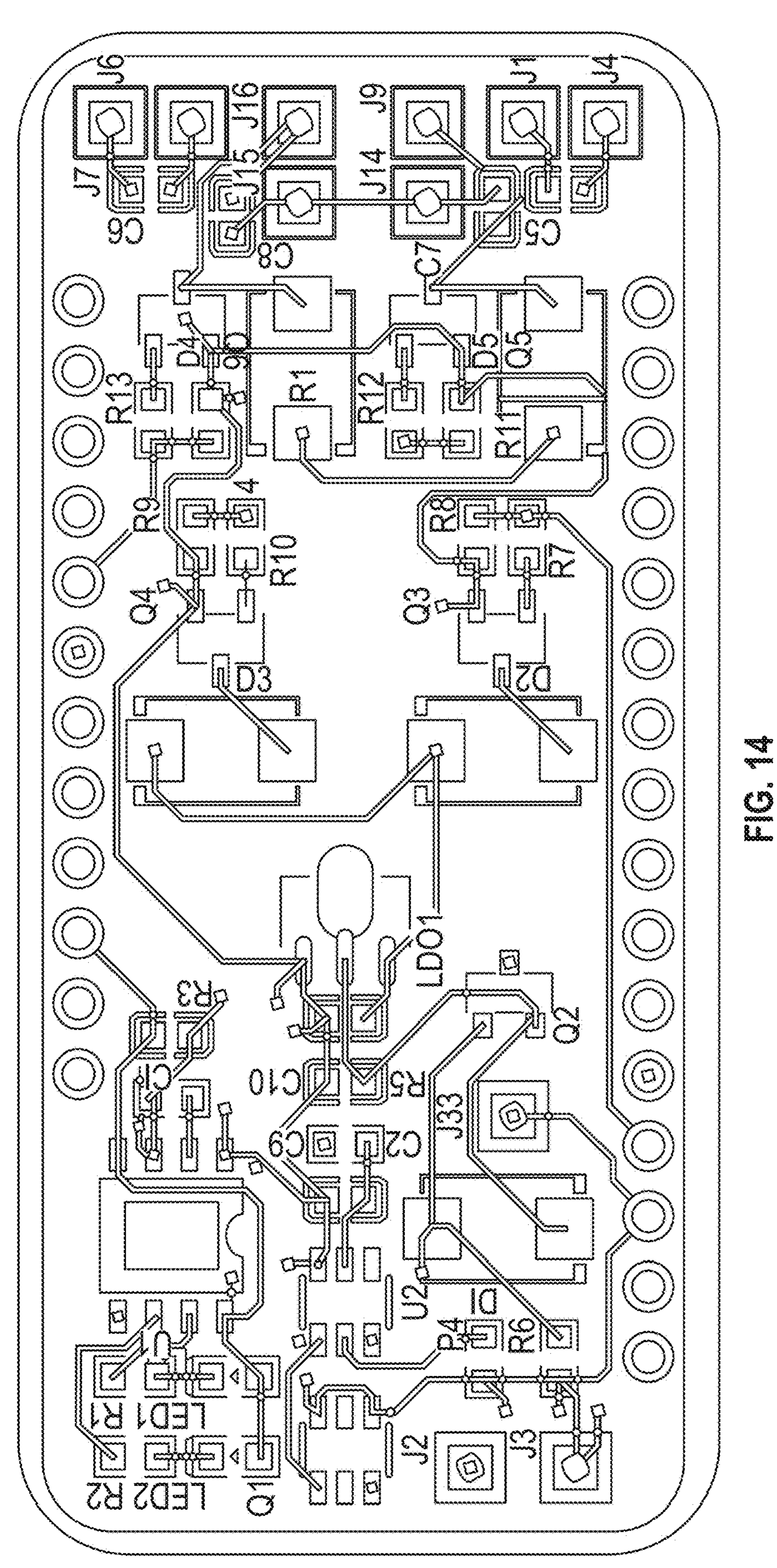
FIG. 14 is a schematic view of an implementation of a shield.
Figure 15:
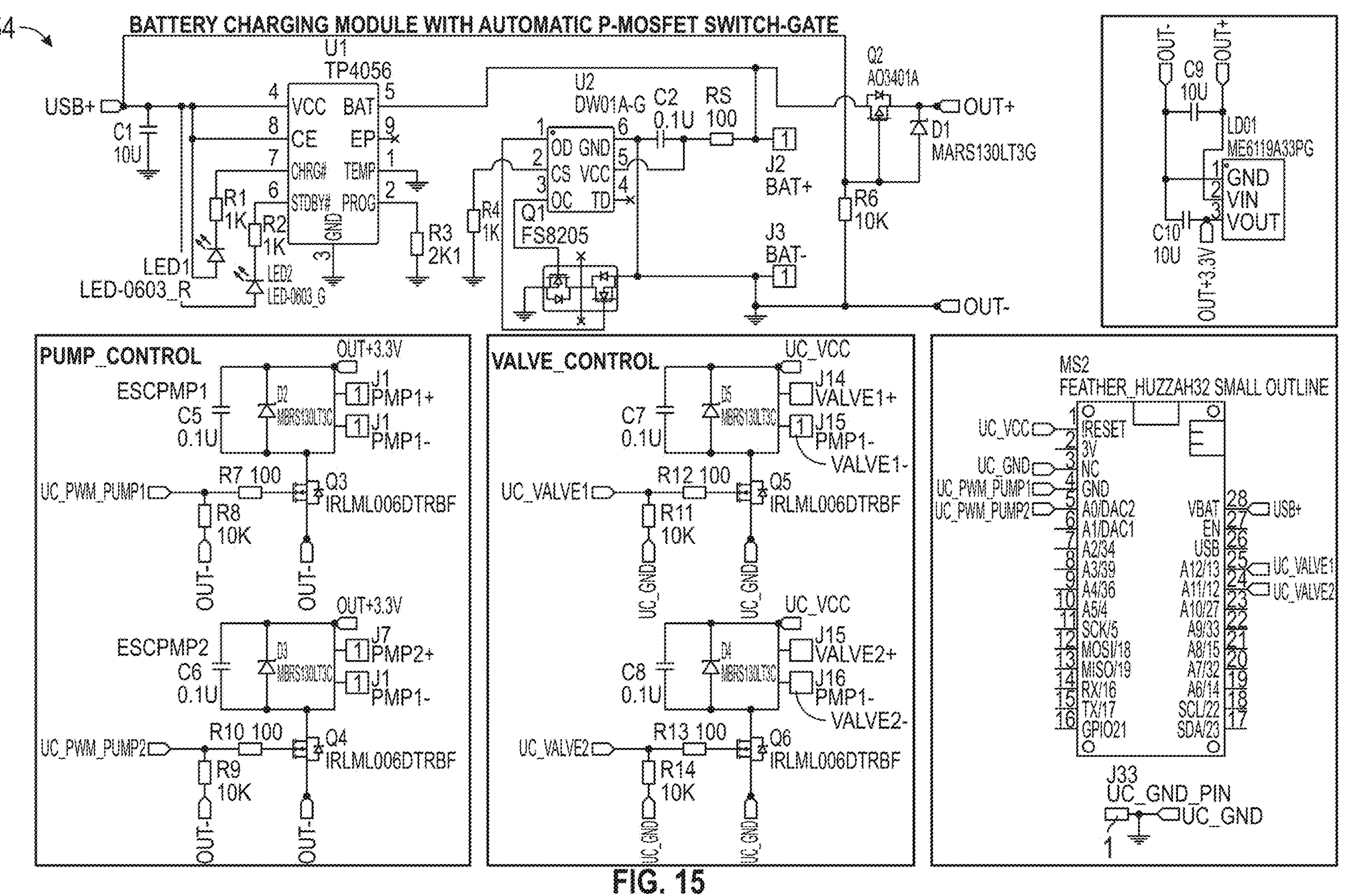
FIG. 15 is a schematic of an implementation of a circuit for use in a haptic feedback and compression portion.

Referring to FIG. 14, a circuit diagram 52 of a circuit board marketed under the tradename ESP32_HUZZAH by Adafruit of New York is illustrated. This circuit board may be used in the housing of the haptic feedback and compression portion 6 to control the haptic elements and the pneumatic compression elements by being operatively coupled to the at least one pump and the at least one valve and to the haptic feedback device. Other circuit board designs may be employed, both those that utilize just the components of the shield itself, utilize some of the components of the shield, or operate without using a shield may be utilized in various wristband device implementations. For example, referring to FIG. 15, a schematic 54 of a circuit design for a circuit board for use in a haptic feedback and compression portion is illustrated, showing various modules including a battery charging module, pump control module, valve control module and power port designed to work with the ESP32_HUZZAH shield circuit diagram 52 illustrated in FIG. 14.

Figure 16:
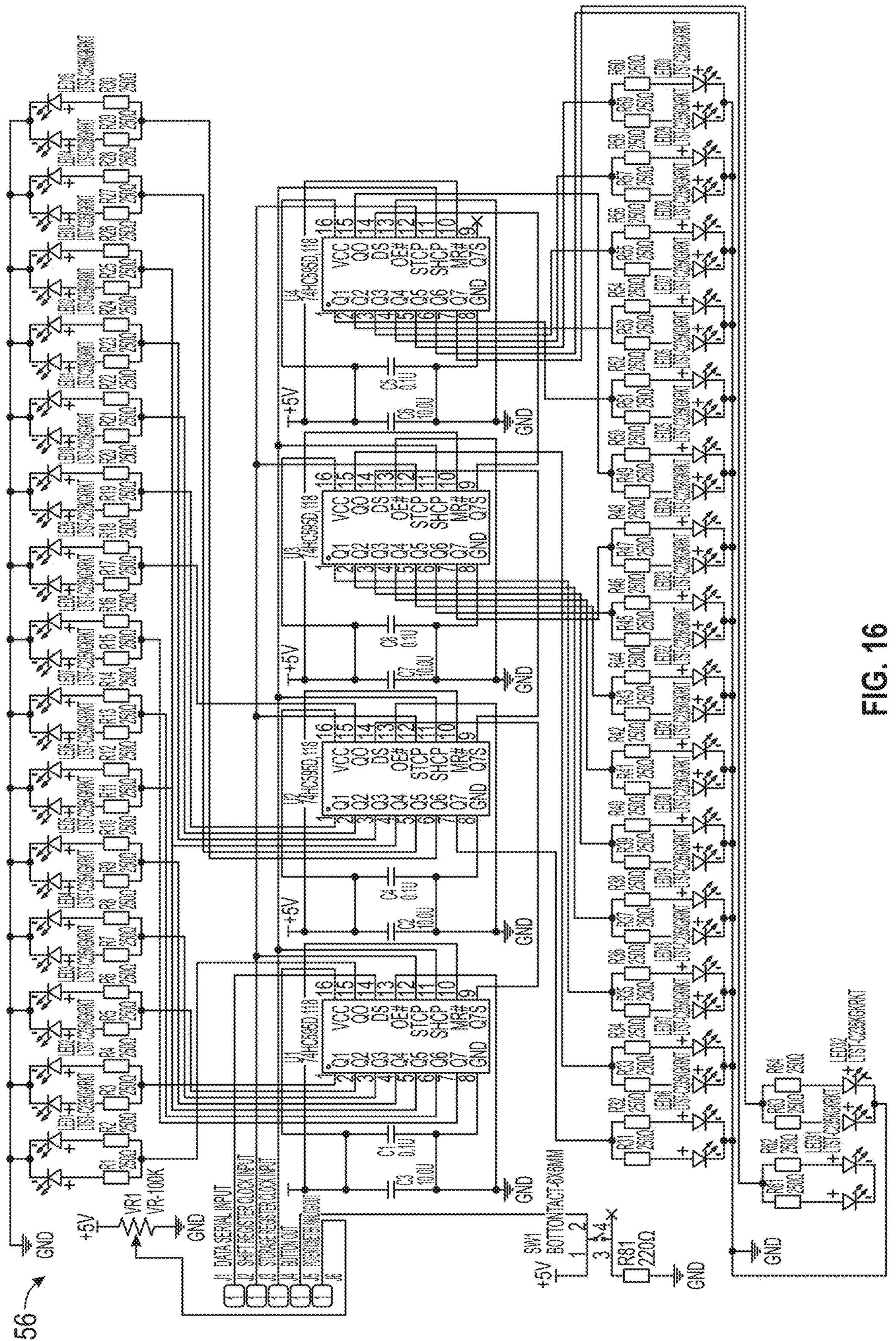
FIG. 16 is a schematic of an implementation of a circuit for use in a breathing guidance portion.
Figure 17:
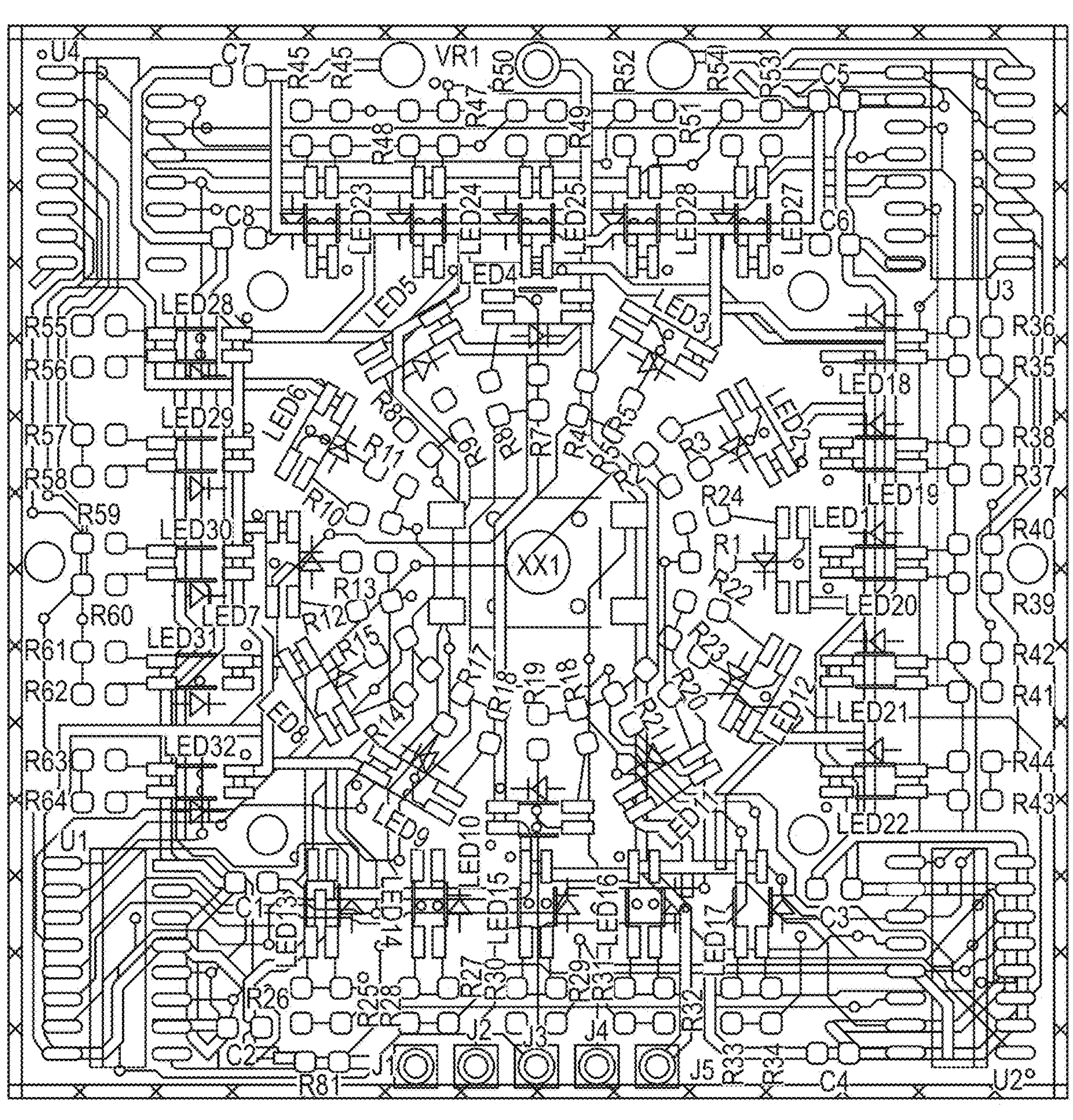
FIG. 17 is a schematic of an implementation of a circuit board for use in a breathing guidance portion.

Referring to FIG. 16, a circuit schematic 56 for a circuit board for use with an implementation of a breathing guidance portion is illustrated that includes two sets of LEDs arranged in the square pattern on the circuit bord and in the circular pattern on the circuit board. A schematic diagram of a circuit board 58 that includes the two sets of LEDS is illustrated in FIG. 17 which show the first set located on the circuit board in a square pattern and the second set located in a circular pattern.

Figure 19:
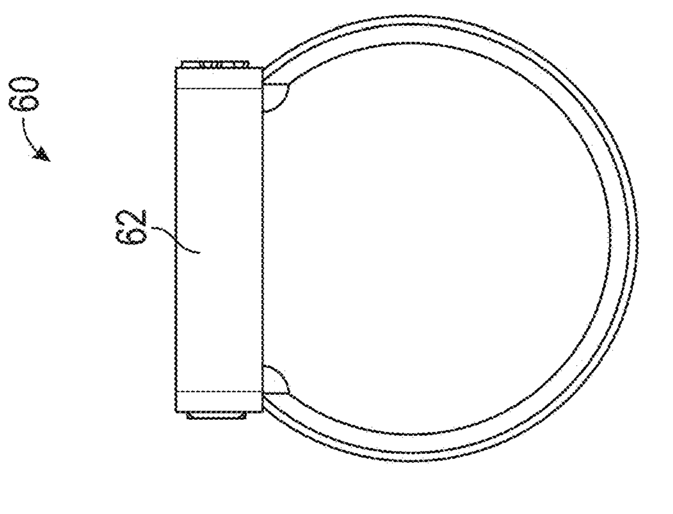
FIG. 19 is a side view of an implementation of a wristband device.
Figure 19:
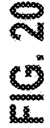
Figure 19:
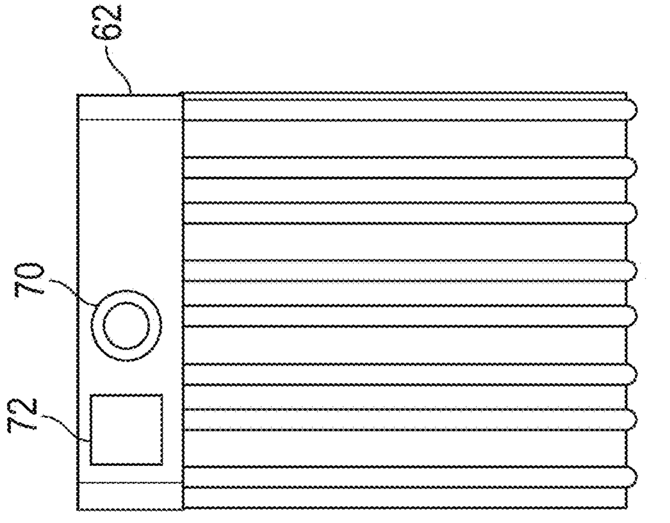
Figure 18:
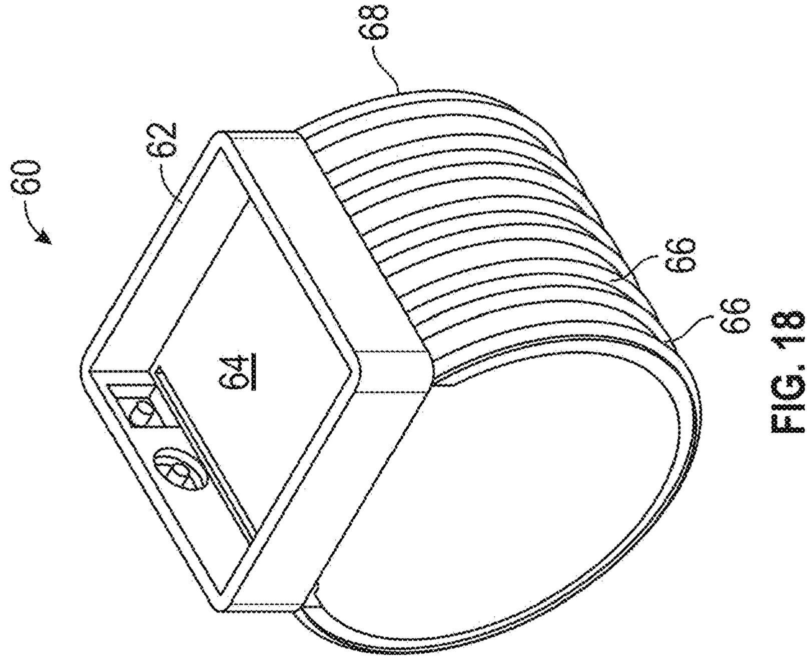
FIG. 18 is a perspective view of an implementation of a wristband device.

While the use of physically separate breathing guidance portions and haptic feedback and compression portions has been illustrated in the wristband devices illustrated thus far, the components of both portions could be included in a single housing as in the wristband device implementation 60 illustrated in FIG. 18. Here a single housing 62 is illustrated with a cavity 64 designed to receive one or more circuit boards, the at least one pump, and the at least one valve along with the two sets of LEDs and a battery. Any top cover or display type disclosed in this document including a privacy film could be employed with the wristband device type. Pneumatic elements 66 which may be any disclosed in this document are included in armband portion 68 which goes around the wearer's wrist. FIG. 19 illustrates how in this implementation, a circular button 70 and a square/rectangular button 72 are included in the housing and designed to interact with the circuit board to enable the haptic feedback, the sets of LEDs, and the pneumatic elements using the various structures and methods disclosed herein. FIG. 20 illustrates a side view of the wristband device 60 that shows that its profile is similar to that of a smartwatch with all of the components needed to operate it included in the housing 62.

The various wristband device implementations disclosed in this document may be utilized in various implementations of a method of treating anxiety or ADHD. The method includes providing a wristband device like those disclosed in this document and activating at least a first LED of a first set of LEDs to guide a box breathing technique by a wearer of the wristband. In a particular implementation, simultaneously, the method includes activating the pneumatic compression elements in the armband portion to cause compression on the wrist of the wearer. The method also includes releasing the compression elements and deactivating at least the first LED of the first set of LEDs and activating at least a second LED of the first set of LEDs while simultaneously activating the compression elements.

In another method implementation, the application of compression may not take place and so the method elements would just include the elements of activating and deactivating the LEDs. In other method implementations, the elements of activating and deactivating the LEDs may occur sequentially around the box shape formed by the LEDs on the circuit board or around the circle chape formed by the LEDs on the circuit board. In particular method implementations, the entire activating and deactivation cycle for both the first set of LEDs (if selected) and for the second set of LEDs (if selected) would be completed in thirty-two seconds. Where the second set of LEDs is used to guide a circle breathing technique, a first rotation of sixteen LEDs make take place in sixteen seconds followed a second rotation of sixteen LEDs in an additional sixteen seconds. Similarly, in a box breathing technique using the first set of LEDs arranged in the square pattern, a first rotation of sixteen seconds through the LEDs following a second rotation of 16 seconds through the LEDs may be utilized.

Where the use of haptic and/or compression feedback is being used, the wearer may simultaneously press either the square or the round button on the breathing guidance portion while pressing the first button or second button in the haptic feedback and compression portion to select either haptic or compression feedback (or vice versa). When this is done, a corresponding predetermined thirty-two second duration period of periodic activation of the haptic element and/or the pneumatic compression elements is carried out, timed to correspond with the activation and deactivation of the first set of LEDs or second set of LEDs. In this way, the wearer can receive both visual guidance and physical feedback to help the wearer with refocusing using the breathing techniques disclosed herein. In particular implementations, the periodic activation of the haptic element and/or the pneumatic compression elements may be carried out in four seconds on/four seconds off periods for thirty-two seconds. While these particular time durations are disclosed herein, other time durations could be utilized, and in particular method implementations, the wearer may be able to adjust the time durations.

In various implementations, two 3.7 V batteries may be included in the housing(s) of the wristband device. A brushed motor and an electric speed controller may be utilized for the at least one pump and a solenoid may be used to drive/control the at least one valve in various system implementations. The first set of LEDs and the second set of LEDs may utilize 74HC595D shift registers with a center button to activate/control activation/deactivation of the LEDs.

In particular implementations, an app/application operating on a portable computing device like a smartphone or laptop may be utilized to transmit programming and instructions to the components of the wristband device. This may be accomplished by either using the power port and sending data through the power port connection to either or both of the breathing guidance portion or the haptic feedback and compression portion or by including a wireless communication module in either of the two portions. The wireless communication module may be designed to communicating using one or more of the following non-limiting examples of wireless communication systems and protocols: WIFI®, 802.11b, 802.11a, 802.11ac, BLUETOOTH®, ZIGBEE®, or any other wireless communication protocol. In such implementations, the initiation of the breathing guidance portion and/or the haptic feedback and compression portion may take place using the portable computing device itself and not using a physical button on the wristband device or a button on a display of the wristband device. A wide variety of apps and methods of transmitting data, receiving data, and transmitting instructions using a portable computing device may be developed using the principles disclosed herein.

In places where the description above refers to particular implementations of wristband devices and implementing components, sub-components, methods and sub-methods, it should be readily apparent that a number of modifications may be made without departing from the spirit thereof and that these implementations, implementing components, sub-components, methods and sub-methods may be applied to other wristband devices.

What is claimed is:

1. A wristband device comprising:

a housing comprising a breathing guidance portion and a haptic feedback and compression portion; and an armband portion comprising pneumatic compression elements configured to cause compression in the wrist of a user;

wherein the breathing guidance portion comprises at least a first set of light emitting diodes arranged in a square pattern;

wherein at least a first light emitting diode of the first set of light emitting diodes is configured to guide a box breathing technique by the wearer of the wristband device;

wherein the pneumatic compression elements are configured to release when a first light emitting diode of the at least first set of light emitting diodes is deactivated; and wherein the pneumatic compression elements are configured to activate simultaneously with the activation of a second light emitting diode of the at least first set of light emitting diodes.

2. The device of claim 1, wherein the pneumatic compression elements are McKibben muscles.

3. The device of claim 1, wherein the breathing guidance portion further comprises a second set of light emitting diodes arranged in a circular pattern.

4. The device of claim 3, wherein the breathing guidance portion comprises a round button configured to activate the second set of light emitting diodes in a circle breathing cycle and a square button configured to activate the first set of light emitting diodes in box breathing cycle.

5. The device of claim 1, wherein the compression portion comprises at least one pump and at least one valve.

6. The device of claim 1, wherein the housing comprises a privacy film.

7. The device of claim 1, wherein the haptic feedback and compression portion comprises a linear vibration haptic device.

8. The device of claim 7, wherein the housing comprises a button configured to activate the linear vibration haptic device and a button configured to activate the pneumatic compression elements.

9. The device of claim 1, wherein the housing comprises a charging port.

10. A method of treating one of anxiety or attention deficit hyperactivity disorder, the method comprising:

providing a wristband device comprising a breathing guidance portion, a haptic feedback and compression portion, and an armband portion comprising pneumatic compression elements wherein the breathing guidance portion comprises at least a first set of light emitting diodes arranged in a square pattern;

activating at least a first light emitting diode of the first set of light emitting diodes to guide a box breathing technique by a wearer of the wristband device;

simultaneously activating the pneumatic compression elements to cause compression using the pneumatic compression elements on the wrist of the wearer;

releasing the compression elements and deactivating at least the first light emitting diode of the first set of light emitting diodes; and activating at least a second light emitting diode of the first set of light emitting diodes and simultaneously activating the compression elements.

11. The method of claim 10, wherein the box breathing technique is continued for thirty-two seconds.

* * * * *